United States Patent
Igarashi et al.

(10) Patent No.: US 6,230,559 B1
(45) Date of Patent: May 15, 2001

(54) THERMAL TYPE FLOW MEASURING INSTRUMENT AND TEMPERATURE-ERROR CORRECTING APPARATUS THEREOF

(75) Inventors: Shinya Igarashi, Naka-machi; Yasuo Makie, Mito; Kenji Ohta, Hitachinaka; Atsushi Kanke, Hitachi; Takashi Kadohiro, Hitachinaka; Chihiro Kobayashi, Naka-machi, all of (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/111,767

(22) Filed: Jul. 8, 1998

(30) Foreign Application Priority Data

Jul. 8, 1997 (JP) .................................................. 9-182065
Jul. 15, 1997 (JP) .................................................. 9-189450

(51) Int. Cl.[7] ....................................................... G01F 1/68
(52) U.S. Cl. ..................................... 73/204.25; 73/204.19
(58) Field of Search ............................ 73/204.11–204.27

(56) References Cited

U.S. PATENT DOCUMENTS 4,581,929   4/1986   Sugiura .
4,683,858   8/1987   Sato et al. .

FOREIGN PATENT DOCUMENTS 0 240 637    10/1987   (EP) .
60-100218     6/1985   (JP) .
8-278178     10/1996   (JP) .

Primary Examiner—Benjamin R. Fuller
Assistant Examiner—Abdullahi Aw-Musse
(74) Attorney, Agent, or Firm—Evenson, McKeown, Edwards & Lenahan, P.L.L.C.

(57) ABSTRACT

In flow detection by a thermal-type flow measuring instrument, a flow rate valve with reduced measurement error due to temperature variation can be obtained even under environment where a fluid temperature and a circuit temperature are different. A measurement error due to temperature variation of the fluid of the thermal-type flow measuring instrument can be corrected on the basis of a temperature of the fluid by adjusting the measurement error to be constant ratio irrespective of the flow rate. On the other hand, a temperature characteristic of the circuit is adjusted to be substantially zero %.

7 Claims, 17 Drawing Sheets

THERMAL TYPE FLOW MEASURING INSTRUMENT AND TEMPERATURE-ERROR CORRECTING APPARATUS THEREOF

BACKGROUND OF THE INVENTION

The present invention relates to a thermal-type air flow measuring instrument for measuring air flow taken into the combustion engine for automotive vehicles and measurement-error correcting apparatus.

In terms of environmental protection and resource saving, more accurate combustion control is required for the engines of automotive vehicles, and air flow meters capable of detecting inlet air flow with high accuracy are desired. Such control systems as those employing thermal-type air flow measuring instruments capable of measuring directly air mass flow are mainstream today.

One of such measuring instruments is disclosed in Japanese Patent Application Laid-Open No. 8-278178 (1996). The measuring instrument is constructed so as to cancel a temperature characteristic of the thermal-type flow measuring instrument with a temperature characteristic of an electronic circuit. In more detail, the thermal-type flow measuring instrument disclosed therein corrects a dependence of a measurement error depending upon variation of temperature, relative to an air flow rate, by providing a flow rate dependence to cancel the measurement error for the temperature characteristics of a reference voltage generating circuit incorporated in the thermal-type flow measuring instrument.

Another conventional measuring instrument is found in Japanese Patent Laid-Open No. 60-100218. This prior art discloses and teaches the correction method of temperature characteristic of the thermal-type air flow measuring instrument.

The former cancels the temperature-error contained in an output of a bridge circuit formed with a heating resistor, a temperature-sensitive resistor or the like to be caused depending upon temperature variation of the fluid, corresponding to the flow rate, by a temperature characteristic of the electronic circuit. Accordingly, a problem is encountered in that when a difference is caused between a temperature of the fluid and the temperature of the electronic circuit, the correction becomes in effective.

In the latter, the correction of the temperature characteristic is established by adjusting the flow signal only with a definite voltage value in response to the intake air temperature without considering the measured air flow. In practical conditions, however, the output signal corresponding to the air flow is subject to the temperature of air flowing in the heating resistor. This is caused by the following reasons.

The thermal-type air flow measuring instrument is composed of a bridge circuit, in which the output voltage Vout is defined by the formula 1.

$$\text{Vout} = (A + Bv(Q)) \quad (1)$$

In the formula 1, constants A and B are constant with respect to the air flow Q, but have temperature sensitive characteristics. This is because temperature sensitive characteristics of constants A and B are influenced by the thermal conductivity of air. In other words, the constants A and B reflect changes in physical properties of air such as thermal conductivity and kinematic viscosity. Thus, the differential coefficient of the output of the bridge circuit with respect to the temperature T, that is, dV/dT, is dependent upon air flow. In addition, the influence of thermal conduction from the heating resistor to the members on which the heating resistor is supported is also another factor of air flow dependency. Thus, in the prior art, there is such a problem that correction of temperature characteristic can not be established for the wider range of air flow and for the wider range of working temperature.

SUMMARY OF THE INVENTION

An object of the present invention is to improve the temperature characteristic of the thermal-type air flow measuring instrument for the wider range of air flow and for the wider range of working temperature.

According to one aspect of the present invention, the thermal-type flow measuring instrument is designed for correcting a measurement error caused due to variation of a temperature of a fluid of a thermal-type flow measuring instrument on the basis of a temperature of the fluid, in which a temperature-error of the thermal-type flow measuring instrument is kept at a constant rate irrespective of a flow rate so that the correction can be done unitarily on the basis of only the temperature signal.

According to another aspect of the present invention, the intake air temperature in the intake pipe is measured and, by means of micro-computers, used for correcting the measured temperature so as to compensate the error for the air flow dependency of the output temperature characteristic of the thermal-type air flow measuring instrument.

DETAILED DESCRIPTION OF THE PREFERRED EMBODIMENTS

Embodiments of the present invention will be discussed hereinafter with reference to FIGS. 1 to 25.

Figure 1:
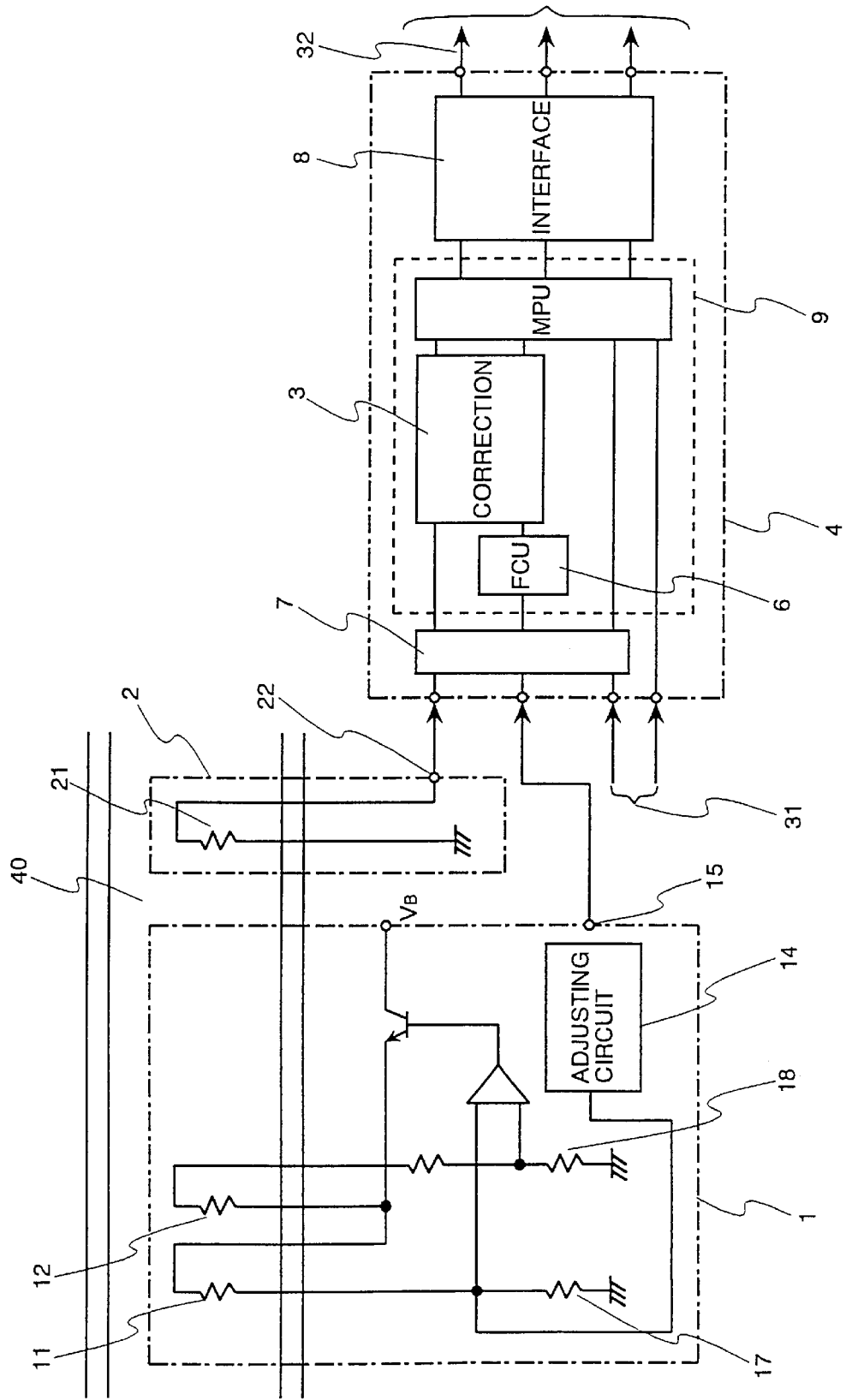
FIG. 1 is an illustration showing a construction of a control system as a typical embodiment of the present invention.

A construction of a control system employing a temperature-error correcting apparatus as a typical embodiment of the present invention is illustrated in FIG. 1.

The thermal-type flow measuring instrument 1 is constructed by mounting a heating resistor 11 for detecting a flow rate and a reference resistor 12, which is a temperature-sensitive resistor having a resistance value depending upon a temperature of a fluid and which provides a reference to a heating temperature of the heating resistor, to positions within a fluid passage 40. A bridge circuit is formed with the heating resistor 11, the reference resistor 12 and other resistors 17 and 18. The heating resistor 11 is controlled so that a temperature thereof is maintained higher than a temperature of the fluid detected by the reference resistor 12 in a given constant temperature. Accordingly, since a current is supplied to the heating resistor 11 so that a heat amount equal to a discharge amount to the fluid from the heating resistor 11 is supplied, a current value flowing through the heating resistor 11 becomes a signal corresponding to the flow rate of the fluid. This current is converted into a voltage by a resistor 17 (operating as a fixed resistor), and adjusted by an output characteristics adjusting circuit 14 for outputting a flow rate signal 15.

On the other hand, a fluid temperature detecting device 2 is designed by arranging a temperature-sensitive resistor 21, such as a thermistor, within the fluid passage 40, which outputs a resistance per se or a voltage value upon supplying a constant current, as a temperature signal 22.

The foregoing fluid signal 15 and the temperature signal 22 are input to a control unit 4 together with other signals 31. Each of the input signals are converted into digital values by an A/D converter 7 and processed in a microcomputer 9. Here, since the flow rate signal is a voltage signal which is indeed non-linear relative to the flow rate, the flow rate signal is further converted into a linear flow rate value in a flow rate converting portion 6 after conversion into the digital value, and is corrected for measurement error due to temperature variation of the fluid in a temperature correcting unit 3 to be a flow rate signal to obtain a flow rate value with reduced temperature-error. The flow rate signal after temperature correction, the temperature signal and other signals are input to the control portion 5 and control signals 32 for the engine or equipment are output by the control unit 4 via an interface 8, such as a D/A converter or the like.

Figure 2:
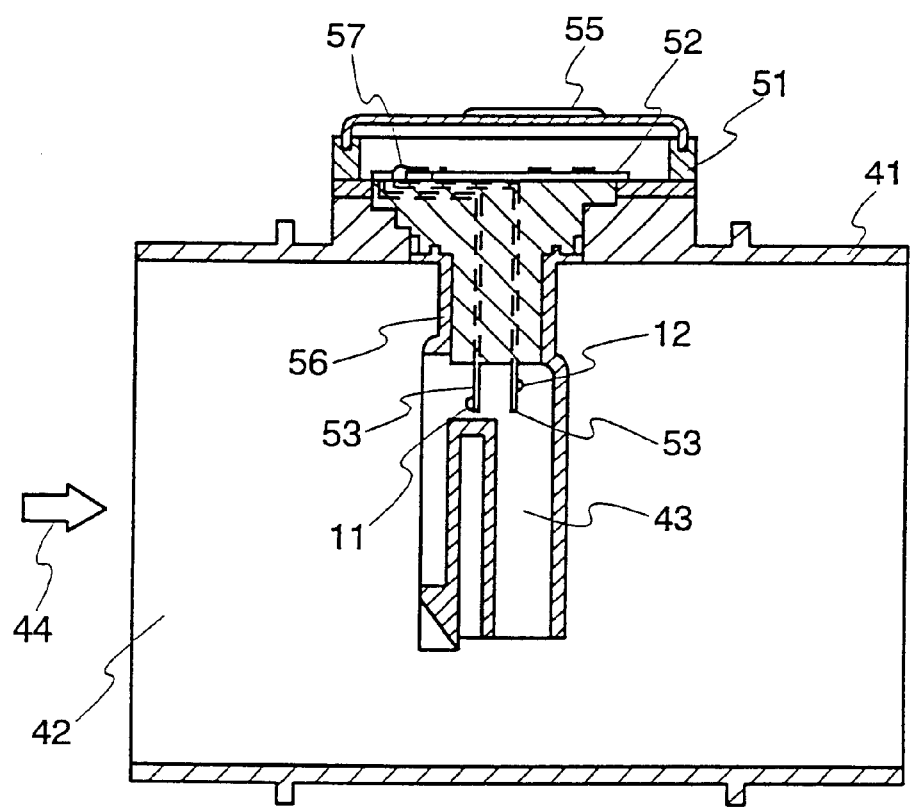
FIG. 2 is a cross section of one embodiment of a thermal-type flow measuring instrument to be employed in the present invention.
Figure 3:
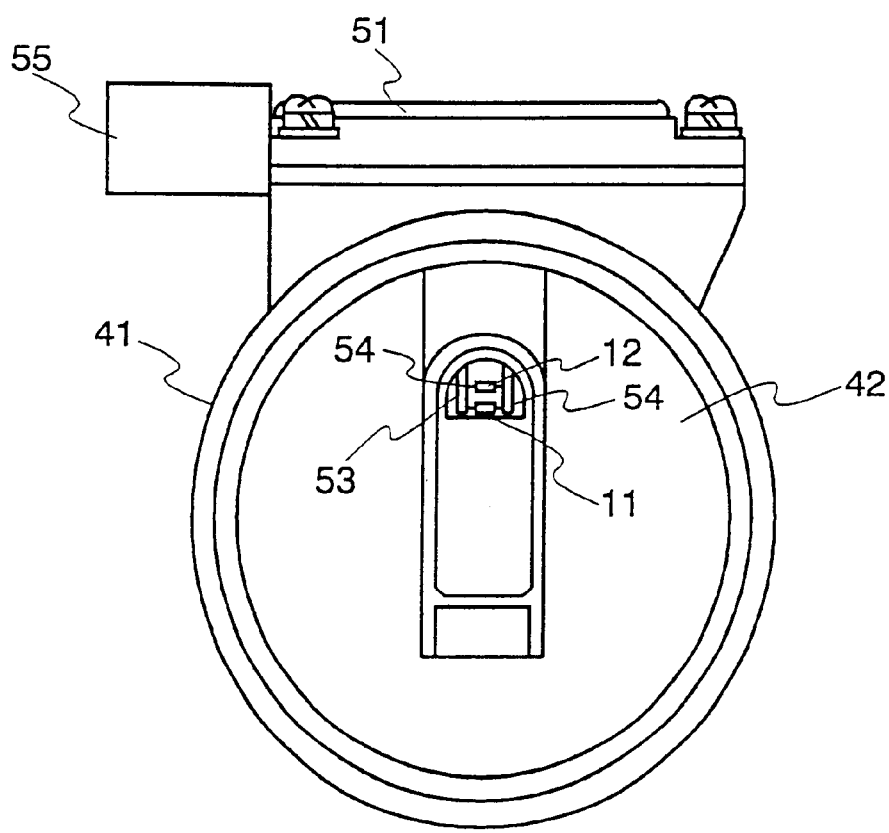
FIG. 3 is an external view of FIG. 2 as viewed from an upstream side.

Next, as one embodiment of the thermal-type flow measuring instrument to be employed in the present invention, a construction of a thermal-type air flow measuring instrument for measuring an intake air flow rate of an internal combustion engine will be discussed with reference to a cross-section of FIG. 2 and an external view as viewed from an upstream side of FIG. 3.

The construction of the thermal-type air flow measuring instrument is not required to be varied from the existing product and here, only an outline of the shown embodiment will be discussed. The thermal-type flow measuring instrument is constructed with a housing 51 receiving a circuit substrate 52 forming an electronic circuit. An auxiliary passage forming member 56 is fixed which forms housing 51 and a body 41 to be the fluid passage. The heating resistor 11 for detecting the flow rate and the reference resistor 12 have conductive leads 54 on both ends and are fixedly arranged within an auxiliary passage 43 by fixing both ends of the conductive leads 54 on a terminal 53. The terminal 53 is formed of a conductive material and is extended into the inside of the housing 51 to be connected to the circuit substrate 52 via a wire 57. Intake air 44 (as the object to be measured) flows through the fluid passage defined in the body 41 as a main passage 42 and a part of the intake air is branched to flow through the auxiliary passage 43 for obtaining a signal corresponding to an air flow rate by the electronic circuit on the basis of the amount of heat radiation from the heating resistor 11. This signal is output to an external device via a connector 55.

Figure 4:
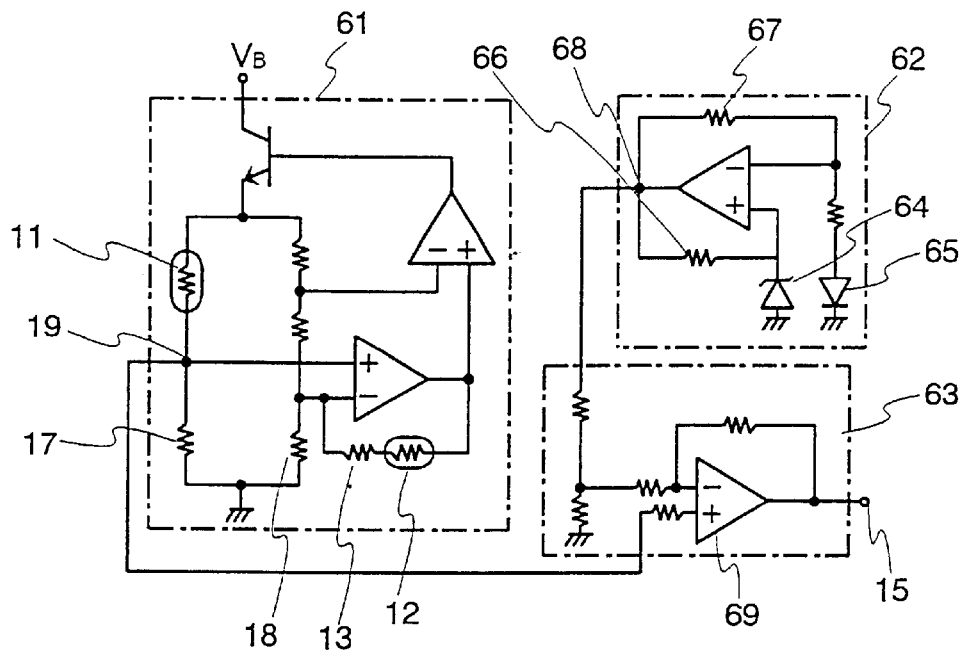
FIG. 4 is a circuit diagram of an electronic circuit of the thermal-type flow measuring instrument of FIG. 2.

A circuit diagram of an electronic circuit of the thermal-type air flow measuring instrument is shown in FIG. 4. The electronic circuit controls a heating temperature of the heating resistor 11 and is mainly divided into a control circuit 61, in which a signal 19 corresponding to the flow rate can be obtained, a temperature compensation circuit 62 for correcting variation of output due to a temperature variation utilizing temperature characteristics of a Zener diode 64 and a diode 65, and an output characteristics adjusting circuit 63 for adjusting the zero level of the signal 19 corresponding to the flow rate and a gain for adapting to predetermined flow rate characteristics.

A control circuit 61 is different in construction from the single bridge circuit shown in FIG. 1, but further is a circuit having the same function as the single bridge as controlling the temperature of the heating resistor 11 with respect to the air temperature corresponding to the resistance value of the reference resistor 12 so as to be higher than the latter at a given constant temperature.

The temperature compensation circuit 62 is adapted to obtain a reference voltage 68 of the output characteristics adjusting circuit 63 having arbitrary temperature characteristics by adjusting a resistor 66 or a resistor 67 utilizing the temperature characteristics of the Zener diode 64 and the diode 65.

The output characteristics adjusting circuit 63 inputs the signal 19 corresponding to the flow rate of the control circuit 61 and obtains the flow rate signal 15 adapted to the given flow rate characteristics using zero span adjustment by an operational amplifier 69. Here, a voltage to be a reference for zero point adjustment is adjusted to arbitrary temperature characteristics by the temperature compensation circuit 62 to make it possible to adjust the temperature characteristics of the flow rate signal 15.

Figure 5:
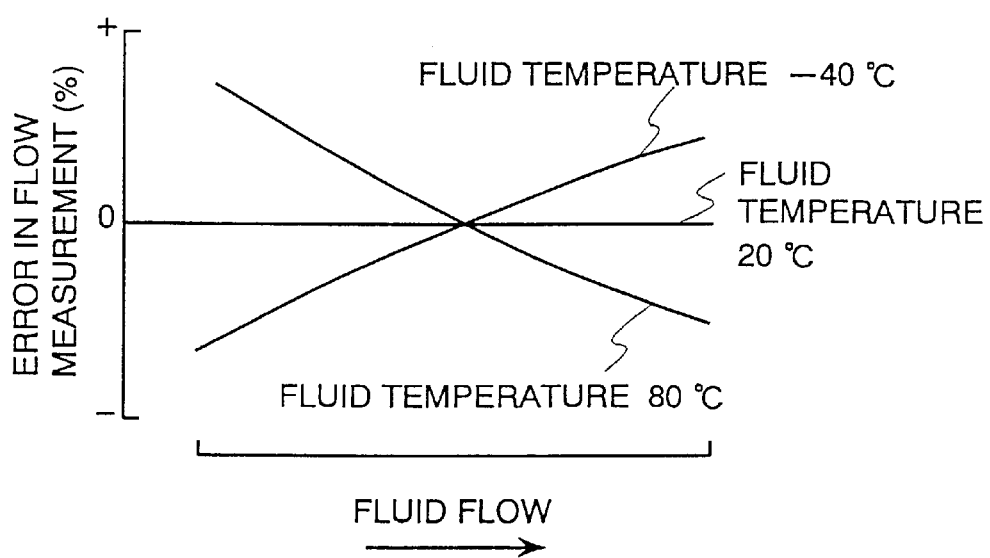
FIG. 5 is an illustration of one conventional example of a measurement error due to a fluid temperature of the thermal-type flow measuring instrument.
Figure 6:
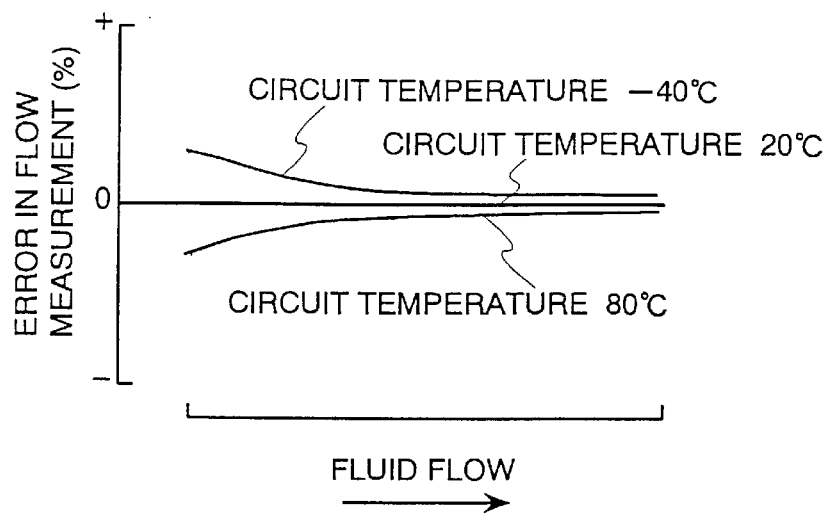
FIG. 6 is an illustration of one conventional example of a temperature characteristic of a circuit of the thermal-type flow measuring instrument.
Figure 7:
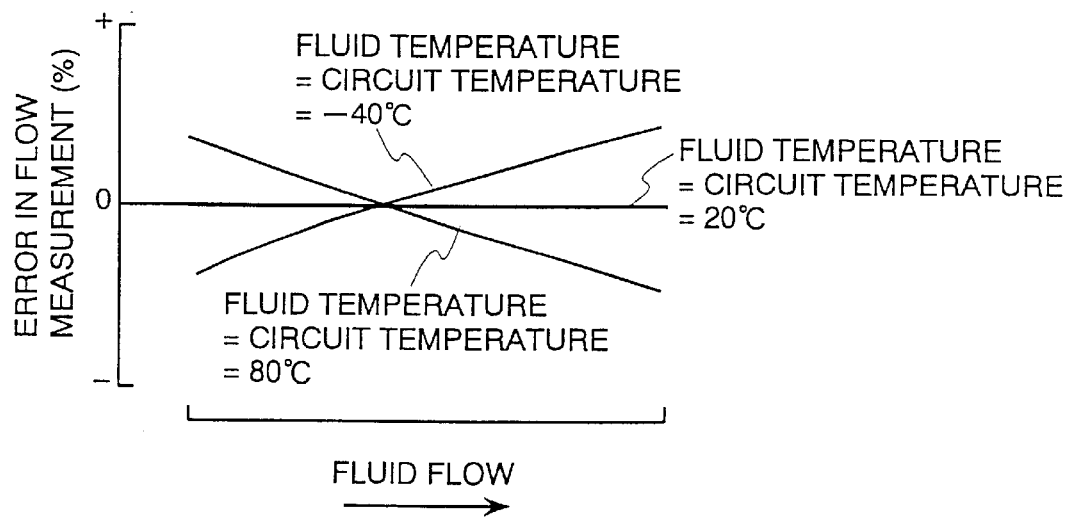
FIG. 7 is an illustration of one conventional example of a unitary temperature-error of the thermal-type flow measuring instrument.

FIGS. 5 to 7 show temperature characteristics of the flow rate signal of the thermal-type flow measuring instrument in the cases of conventional temperature-error adjustment for measurement error at a temperature 80° C. and a temperature −40° C. while taking an error of the output characteristics as zero % at 20° C.

FIG. 5 shows measuring error when only temperature of the fluid is varied to 80° C. or −40° C. by ignoring a resistance on the circuit substrate and the temperature characteristics of the element. The flow rate measurement error due to variation of the temperature of the fluid is differentiated depending upon the flow rate shown in FIG. 5 and, namely, has a flow rate depending on a varying physical value of the fluid, such as thermal conductivity, kinematic viscosity and so forth, and being influenced by thermal conductivity of the lead or the like.

The measurement error can be adjusted by a resistor 13 connected with the reference resistor 12 in series. Conventionally, the resistor 13 is set in an extent shown in FIG. 5 so that the measurement error becomes close to zero over the entire range of the flow rate.

On the other hand, the resistance on the circuit substrate and the temperature characteristics of the element appear as the sum of the temperature characteristics of respective elements and respective resistors, and can be adjusted by the temperature compensation circuit as set forth above. The temperature characteristics becomes a constant voltage irrespective of the flow rate. However, the measurement error upon conversion into the flow rates becomes large at low flow rate and small at high flow rates. Accordingly, in order to cancel the flow rate dependency of the measurement error shown in FIG. 5 as much as possible, adjustment is performed to establish the temperature characteristics with a slight measurement error as shown in FIG. 6.

As set forth above, when the fluid and the circuit are indeed varied into the same temperature as set forth above, the measurement error becomes as illustrated in FIG. 7. Since the thermal-type flow measuring instrument measures the flow rate by a heat radiation amount while taking the fluid temperature as reference, the measurement error due to temperature variation becomes smaller in comparison with other flow rate measuring methods. The maximum error shown in FIG. 7 is several % and conventionally not considered to be a significant problem.

However, further precision has been required in recent years, requiring a reduction of the measurement error due to temperature variation. The thermal-type flow measuring instrument disclosed in Japanese Unexamined Patent Publication No. Heisei 8-278178 discussed above as prior art provides one solution for this. This is designed for canceling the flow rate dependency of the measurement error to be caused by variation of the fluid temperature by providing flow amount dependency for the temperature characteristics of the reference voltage 68 to be output from the temperature compensation circuit 62.

Figure 8:
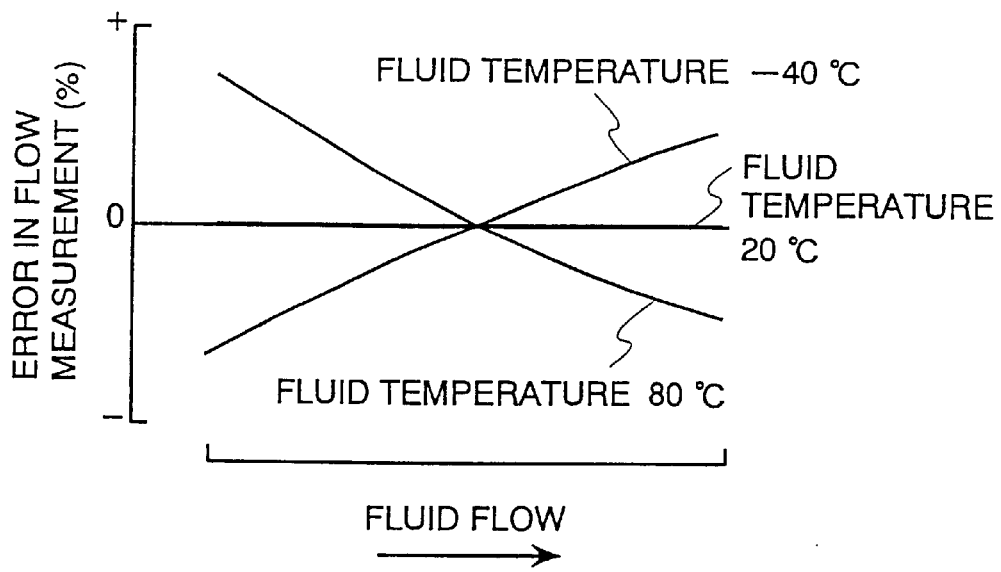
FIG. 8 is an illustration of one conventional example of a measurement error due to fluid temperature of the thermal-type flow measuring instrument.
Figure 9:
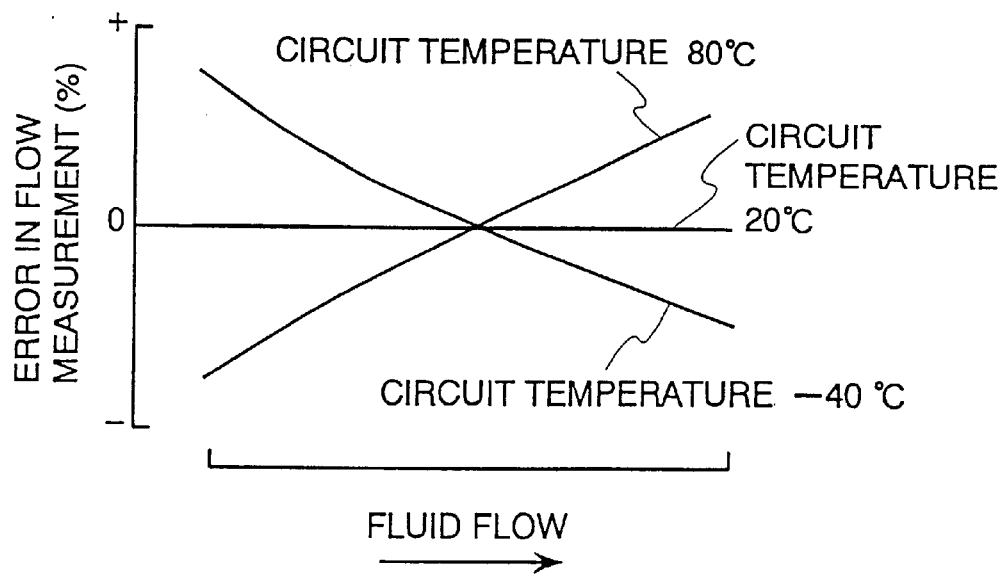
FIG. 9 is an illustration of one conventional example of a temperature characteristic of a circuit of the thermal-type flow measuring instrument.
Figure 10:
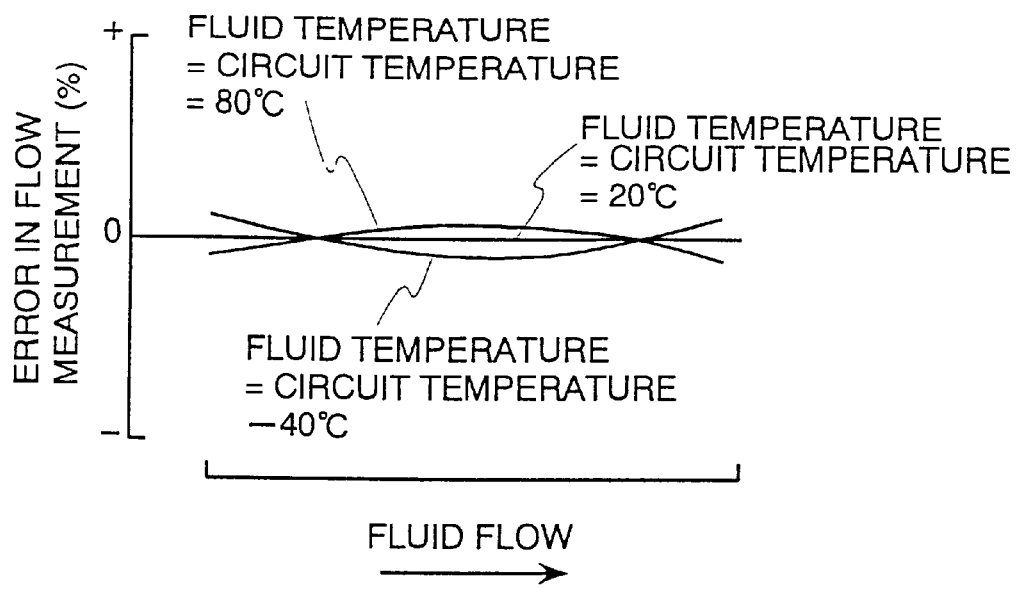
FIG. 10 is an illustration of one conventional example of a unitary temperature-error of the thermal-type flow measuring instrument.
Figure 11:
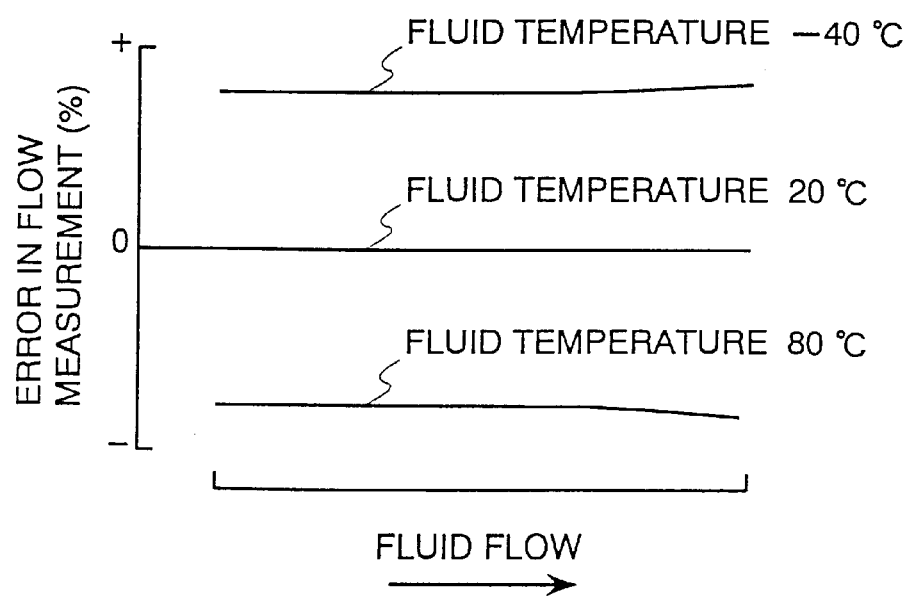
FIG. 11 is an illustration of a measurement error due to a fluid temperature of a thermal-type flow measuring instrument according to the present invention.

Namely, when the conventional temperature-error adjustment set forth above is performed, the measurement error due to temperature variation of the fluid is the same (FIG. 8). However, by enabling the adjustment of the temperature characteristics of the circuit substrate as shown in FIG. 9, the measurement error when temperatures of the fluid and the circuit are varied into the same temperature, becomes substantially zero % as shown in FIG. 10.

However, even in the adjusting method disclosed in Japanese Unexamined Patent Publication No. Heisei 8-278178, while correction is effective when the temperature of the fluid and the temperature of the circuit are substantially the same, appropriate correction becomes impossible when a temperature difference is caused therebetween. For example, in the thermal-type air flow measuring instrument measuring the intake air flow rate introduced into the engine of the automotive vehicle, when cool air is introduced in a condition where the thermal-type air flow measuring instrument is mounted within an engine compartment to subject a circuit portion to heat from the engine place the circuit portion in a heated condition, or so forth, a situation wherein the circuit portion is heated up to about 80° C. while the temperature of the intake air is about 20° C., can be considered. Also, when the vehicle is driven into ambient air in quite cold condition after sufficiently warming up the engine, it is possible that, while the circuit portion is about 20° C., the temperature of the intake air is about −40° C.

Accordingly, in the former example, the temperature characteristics of the circuit substrate become the measurement error of the flow rate signal as is, and in the later example, the measurement error due to temperature variation of the intake air appears as the measurement error of the flow rate signal as it is without being corrected by the temperature characteristics of the circuit.

Therefore, the present invention is adapted to constantly obtain the flow rate value suppressing the temperature-error even in the case where the temperature of the fluid and the temperature of the circuit portion are different, by reducing the measurement error caused due to temperature variation of the fluid by correction on the basis of the temperature of the fluid, and by adjusting the resistance of the circuit substrate and the temperature characteristics of the element to make the measurement error substantially zero % by the foregoing temperature compensating circuit 62.

However, since the measurement error caused by temperature variation of the fluid has a flow rate dependency in the conventional adjustment as set forth above, correction which causes a substantial load, such as deriving a correction coefficient from a map of the flow rate and the temperature becomes necessary.

The present invention adjusts the thermal-type flow measuring instrument to cause a constant measurement error irrespective of the flow rate in order to avoid flow rate dependency, without seeking for zero % of measurement error due to temperature variation of the fluid, in order to perform the correction quite easily. Conversely, without performing adjustment canceling the measurement error due to temperature variation of the fluid, the temperature characteristics of the circuit may be so adjusted or set as not to cause the measurement error (to be substantially zero %).

The adjustment of the measurement error due to temperature variation of the fluid as set forth above can be performed by varying the resistance value of the resistor 13 arranged in series with the reference resistor 12, for example. The measurement error when the temperature of the fluid is varied from 20° C. to 80° C. or to −40° C. upon variation of the resistance value of the resistor 13, is shown in comparison with the conventional adjustment in FIG. 11. In a developed product varying the resistance value of the resistor 13, the measurement error due to the temperature variation of the fluid becomes a negative error at 80° C. but is in substantially constant rate irrespective of the flow rate, and becomes positive error at −40° C. but is in constant rate. The measurement error when the measurement error due to temperature variation of the fluid has no flow rate dependency and is flat, is different depending upon materials forming the heating resistor 11 and the reference resistor 12 and the structures thereof. However, in view of performance and reliability, it is difficulty to make the measurement error flat at zero %. Therefore, it is the point of the present invention to adjust the measurement error to avoid the flow rate dependency by varying the resistance value to be set easily without pretending to make the measurement error to zero %.

Figure 12:
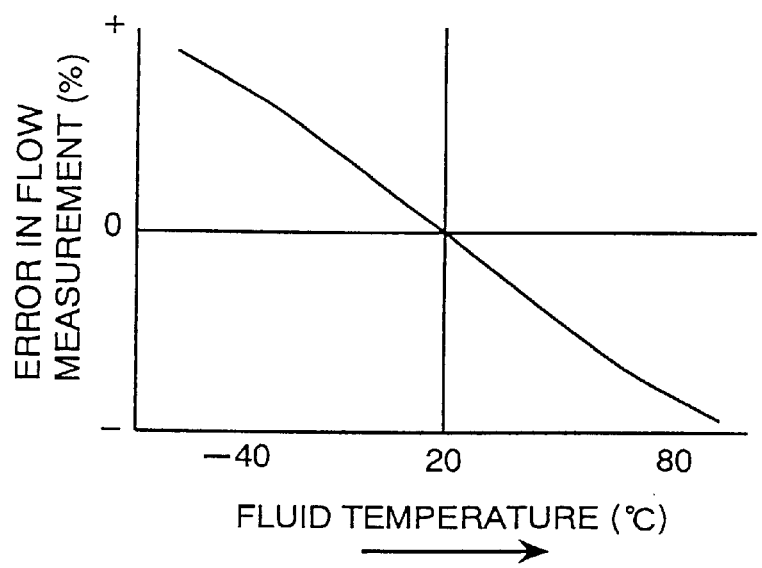
FIG. 12 is an illustration showing a relationship of the fluid temperature and the measurement error of the thermal-type flow measuring instrument according to the present invention.

On the other hand, the measurement error in the constant ratio shows a substantially linear correlation with the temperature as shown in FIG. 12. Accordingly, correction of the measurement error due to temperature variation of the fluid can be done by obtaining a corrected error by multiplying a temperature difference between the actually measured fluid temperature and the reference temperature (20° C. in the shown embodiment) with a gradient coefficient of FIG. 12, by correcting the flow rate obtained from the thermal-type flow measuring instrument in an amount corresponding to the error to obtain the flow rate corrected for the measurement error due to the temperature variation of the fluid irrespective of the flow rate. Thus, the present invention corrects the measurement error due to temperature variation of the fluid by a simple linear equation and is quite easy to perform correction process to make the load of the processing portion smaller.

Figure 13:
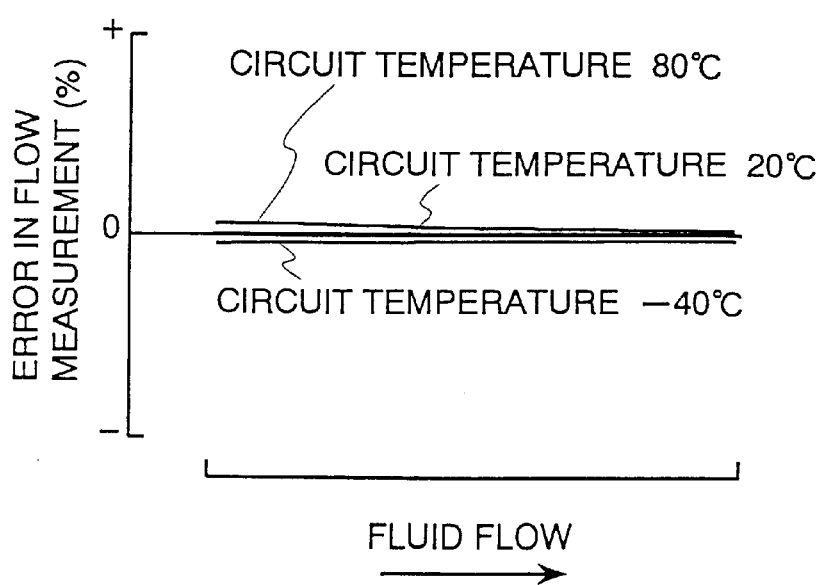
FIG. 13 is an illustration showing a temperature characteristic of the circuit of the thermal-type flow measuring instrument of the present invention.

On the other hand, the temperature characteristics of the circuit is adjusted to achieve substantially zero % of the temperature characteristics of the circuit by the foregoing reference voltage circuit 62, or, in the alternative, the measuring error is made substantially zero % as shown in FIG. 13 by setting the temperature characteristics of the resistor and the element to be small.

Figure 14:
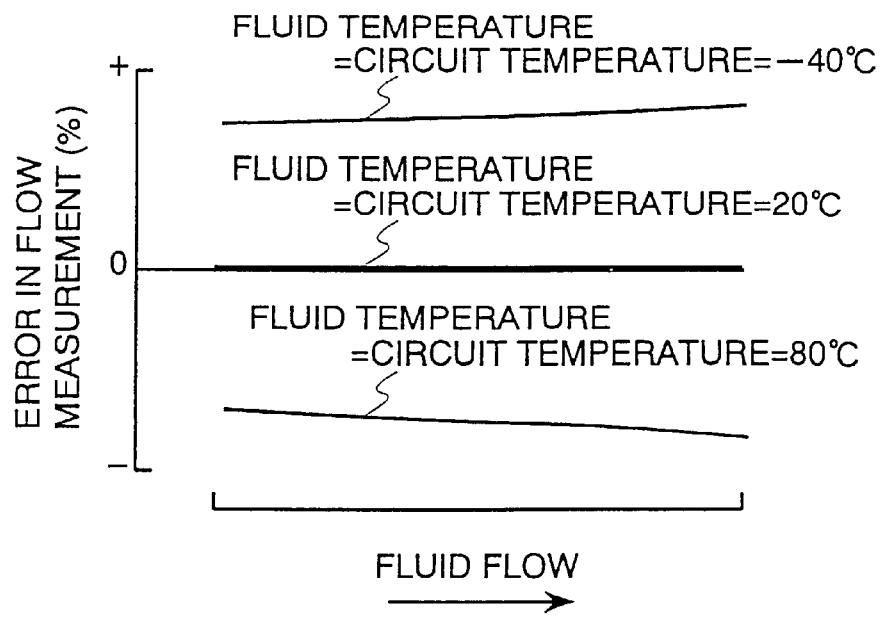
FIG. 14 is a illustration showing an unitary temperature-error of the thermal-type flow measuring instrument according to the present invention, before correction.
Figure 15:
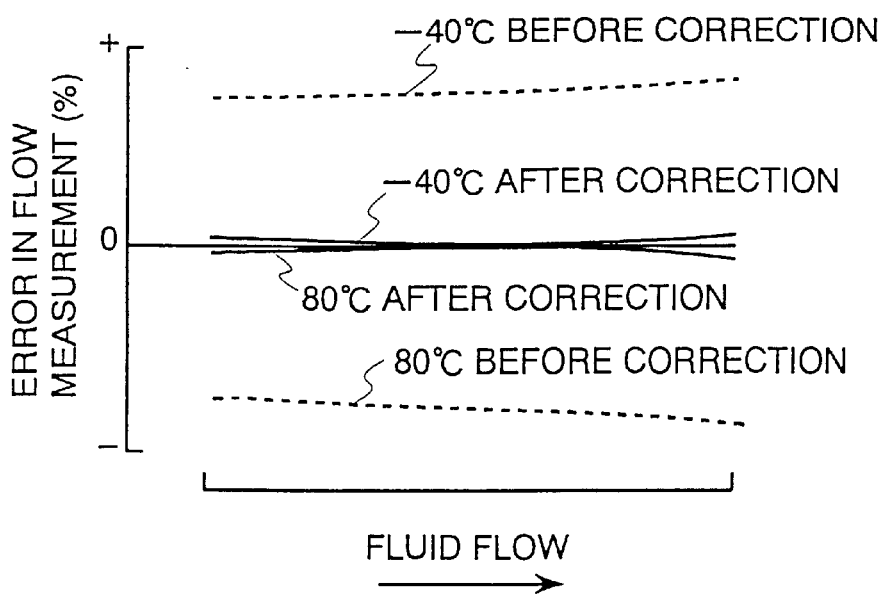
FIG. 15 is an illustration showing a unitary temperature-error of the thermal-type flow measuring instrument according to the present invention, after correction.

Accordingly, when the correcting portion of the measurement error due to temperature variation of the fluid is realized by the external processing unit or control unit of the thermal-type flow measuring instrument, a total temperature-error of the thermal-type flow measuring instrument is substantially equal to the measurement error due to the fluid temperature shown in FIG. 14. However, the measurement error depending upon the fluid temperature is corrected on the basis of the temperature of the fluid by the correction processing portion. Thus, the flow rate value after correction may contain substantially zero % of error due to temperature variation as shown in FIG. 15. In this method, since influences of the fluid temperature and the circuit temperature are corrected independently, the flow rate with reduced measurement error due to the temperature can be obtained in an environment where the fluid temperature and the circuit temperature are different as set forth above.

Figure 16:
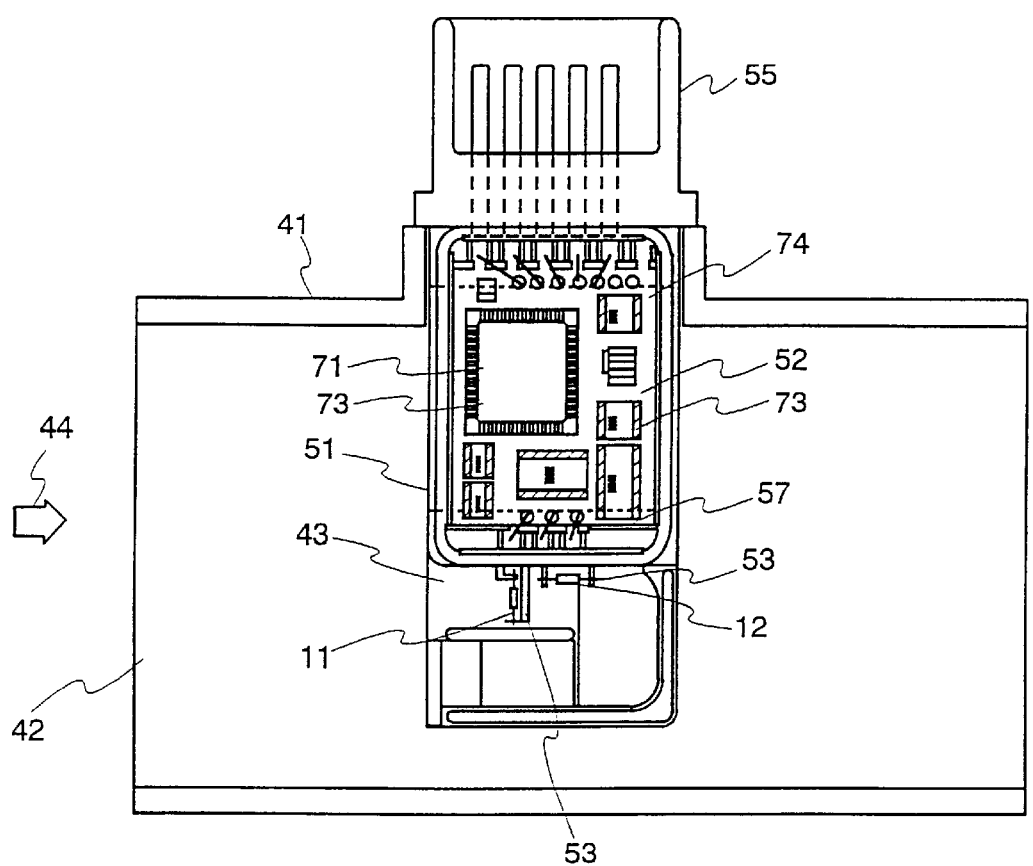
FIG. 16 is a cross section of one embodiment of the thermal-type flow measuring instrument having a correction processing portion of the present invention.
Figure 17:
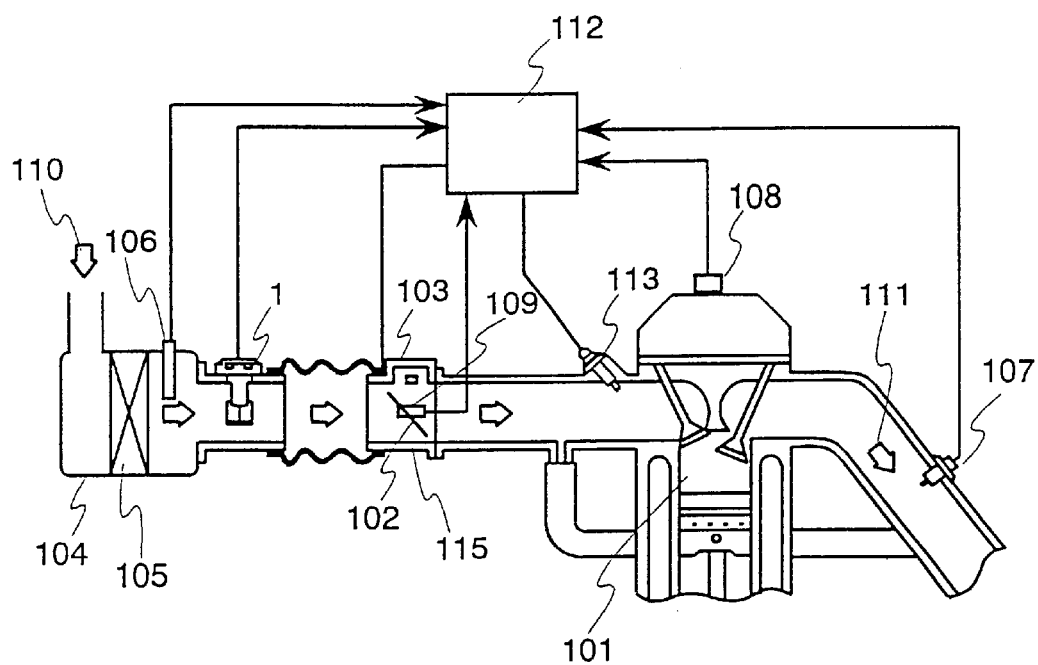
FIG. 17 is an illustration showing a construction of a control system of an internal combustion engine employing the present invention.

Next, concerning one embodiment of the thermal-type flow measuring instrument having the correction processing portion of the measurement error depending upon the fluid temperature set forth above, discussion will be given with reference to FIG. 16 which is a cross section of the thermal-type flow measuring instrument.

The heating resistor 11 for detecting the flow rate and the reference resistor 12 to be a reference for the heating temperature of the heating resistor of the fluid are arranged within the auxiliary passage 43 formed integrally with the housing 51 receiving the electronic circuit 52 therein, and are electrically connected with the electronic circuit 52 via the terminal 53 and the wire 57.

The electronic circuit 52 has CPU 71, an A/D converter, a memory 73, an interface 74 and so forth in addition to the control circuit 61, the reference voltage circuit 62 and the output characteristics adjusting circuit 63 to enable digital conversion within the electronic circuit and to perform an arithmetic process. On the other hand, for temperature measurement of the fluid, a method to separately arrange thermistor or the like can be considered. However, it is also the possible to derive the fluid temperature from the voltages at both ends of the reference resistor 12. Since the current flowing through the reference resistor 12 is variable depending upon the flow rate, the fluid temperature cannot be obtained from the voltage at both ends of the reference resistor 12. However, in the shown embodiment, an arithmetic process by CPU 71 is possible. Also, since the flow signal can be obtained, it becomes possible to obtain the signal corresponding to the fluid temperature by the arithmetic process of the value corresponding to the flow rate on the basis of the Voltage at both ends of the reference voltage 12. Accordingly, by adjusting the measurement error depending upon the temperature variation of the fluid of the fluid signal digitally converted by the A/D converter to a constant rate irrespective of the flow rate as set forth above, the temperature-error can be reduced via correction by CPU 71 on the basis of the temperature of the fluid.

On the other hand, in the shown embodiment, since the circuit substrate 52 is provided within the main passage 42, the circuit temperature becomes closer to the fluid temperature than the case where the circuit substrate is located outside of the main passage. Therefore, it is also possible to make integrated correction of the temperature-error provided that the fluid temperature and the circuit temperature are substantially the same. However, since the circuit temperature is influenced by the external heat due to thermal conduction through the housing easier than the fluid, and since the circuit causes self-heating from the resistor, the element and so forth, the fluid and the circuit cannot become completely the same temperature. Therefore, the temperature characteristics of the foregoing circuit is desired to be adjusted so as to individually make the temperature-error substantially zero %.

Thus, the flow rate signal arithmetically corrected by CPU 71 and the temperature signal of the fluid are output to the external devices from a connector terminal via the interface 74. On the other hand, numerical data, such as coefficients for the arithmetic process or so forth are stored in the memory 73. It is also possible to perform individual adjustment by rewriting the data in the memory 73. Finally, the embodiment when the present invention is applied for controlling the internal combustion engine will be discussed with reference to FIG. 17 which is an illustration showing a construction of the internal combustion engine.

Air introduced into an engine cylinder 101 is controlled by a throttle valve 102 and an idle control valve 103. Intake air 110 is introduced into an air cleaner 104 from the outside, passes through a thermal-type flow measuring instrument 1 and a throttle body 115 via a filter 105, is introduced into the engine cylinder 101, and discharged as an exhaust gas 111 after combustion. On the other hand, within the air cleaner 104, an intake air temperature sensor 106 is arranged. Within an exhaust pipe, an air/fuel ratio sensor 107 is arranged. Also, in the engine, a crank angle sensor 108 is arranged. Within a throttle body 115, a throttle angle sensor 109 is arranged. To a control unit 112, an air flow rate signal, an intake air temperature signal, an air/fuel ratio signal, a crank angle (engine speed) signal, and a throttle angle signal are input. The control unit 112 outputs a fuel control signal for an injector 113 and an open degree signal for the idle control valve 103 for optimally controlling the engine on the basis of the input signals.

Here, by adjusting the measurement error caused by variations of the intake air temperature of the thermal-type flow measuring instrument 1 so as to be at a constant ratio irrespective of the flow rate, correction becomes possible in the control unit 112 on the basis of the intake air temperature signal to obtain the flow rate value reduced by the measurement error due to intake air temperature to permit higher precision engine control.

According to this embodiment of the present invention, since the measurement error due to temperature variation of the fluid of the thermal-type flow measuring instrument can be easily corrected on the basis of the fluid temperature, it becomes possible to obtain the flow rate value with significantly reduced measurement error even in an environment where the temperature of the fluid and the temperature of the circuit are different, by adjusting the temperature characteristics of the circuit of the thermal-type flow measuring instrument so as not to cause measurement error. Thus, enhancement of precision of the system employing the thermal-type flow measuring instrument can be easily achieved without requiring significant variation of the system.

Another embodiment of the present invention is now described in detail with attached drawings.

Figure 23:
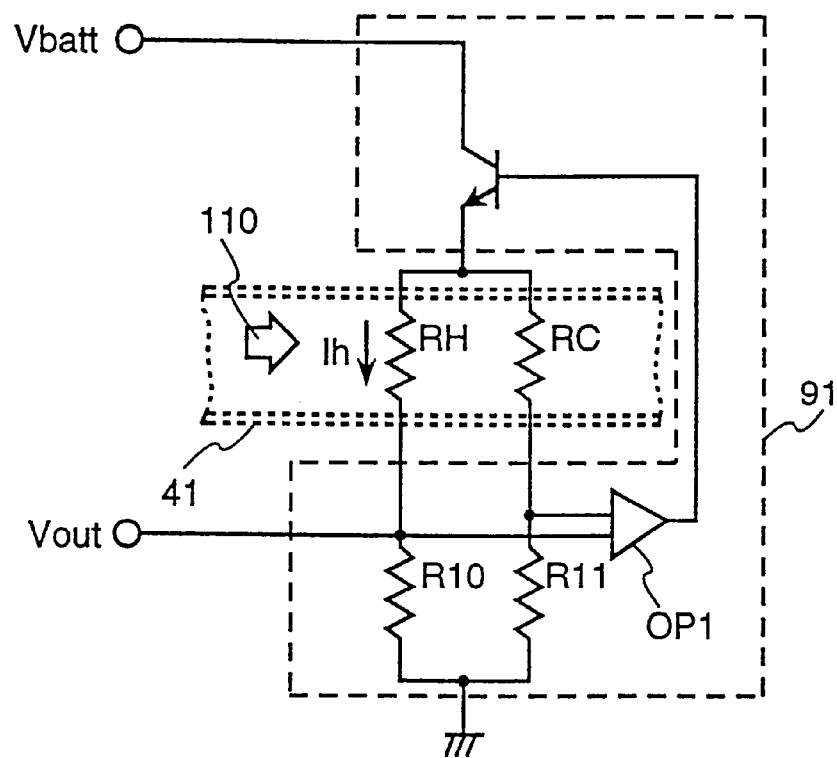
FIG. 23 is a circuit diagram of the thermal-type air flow measuring instrument.

At first, the basic principle of operation of the thermal-type air flow measuring instrument is described. FIG. 23 is a schematic circuit diagram of the thermal-type air flow measuring instrument. The drive circuit 91 of the thermal-type air flow measuring instrument is mainly composed of a bridge s circuit and a feedback circuit. The heating resistor 3RH for measuring intake air flow, the temperature-sensitive resistors 4RC for compensating the intake air temperature, and resistors R10 and R11 are made to form a bridge circuit, and feedback operation is performed by operational amplifier OP1 and the output signal V2 corresponding to the air flow is put out by sending a heating current Ih to the heating resistor 3RH so as to maintain a constant temperature difference between the heating resistor 3RH and the temperature-sensitive resistor 4RC. For example, in case the air flow is faster than that desired, as the amount of heat removed at the heating resistor 3RH is larger, the supplied heating current Ih is increased, In contrast, in a case where the air flow is slower than that desired, as the amount of heat removed at the heating resistor 3RH is smaller, the heating current Ih is reduced or made small enough.

Figure 24:
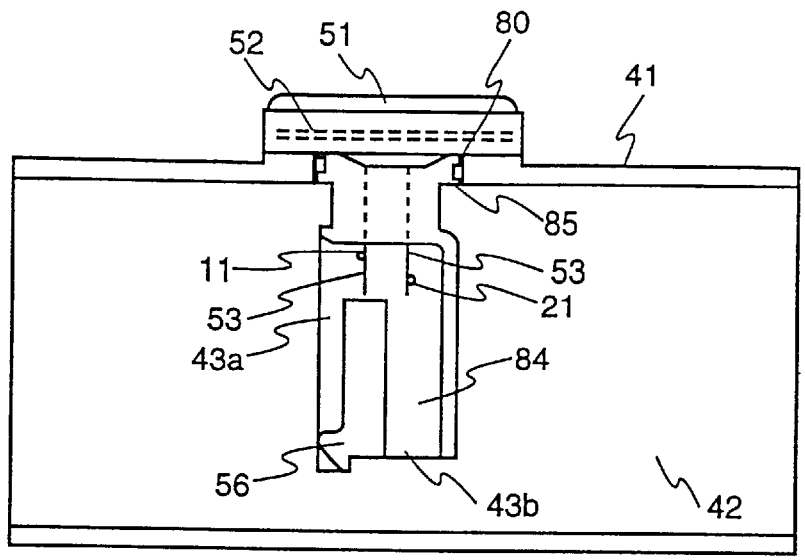
FIG. 24 is a cross-sectional view of the thermal-type air flow measuring instrument.
Figure 25:
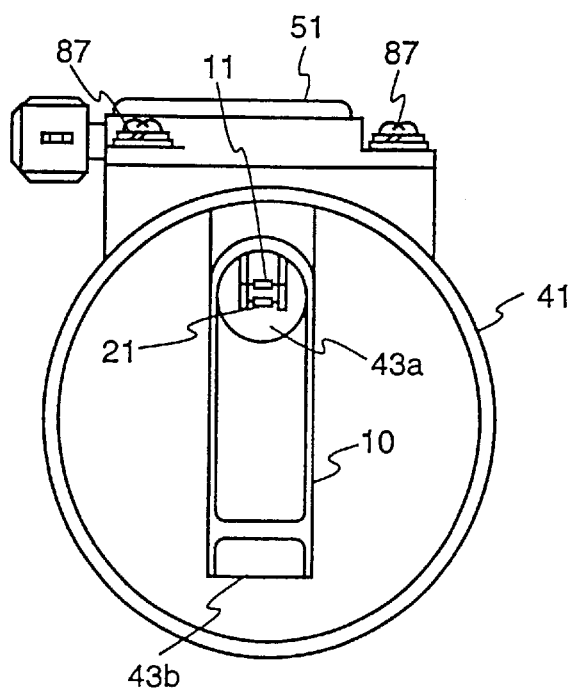
FIG. 25 is a cross-sectional view projected from the left side (upstream side) of FIG. 24.

FIG. 24 is a cross-sectional view of an example of the thermal-type air flow measuring instrument, and FIG. 25 is an exterior view from the upstream (or left side in FIG. 23) of the example of the thermal-type air flow measuring instrument.

As for the components of the thermal-type air flow measuring instrument, there are a housing member 51 containing a circuit board 52 forming the drive circuit, and auxiliary passage composition member 56 formed with non-conductive materials. In the auxiliary passage composition member 56, the heating resistor 11 for detecting the air flow and the temperature-sensitive resistor 21 for compensating the intake air temperature are arranged so as to be connected electrically to the circuit boards through the support member 53 composed of conductive materials, and thus, a single module in the thermal-type air flow measuring instrument is formed with the housing, the basic circuit board, the auxiliary passage, the heating resistor, the temperature-sensitive resistor and so on. In addition, a hole 85 is formed on the wide wall of the main passage 41 forming the intake air pipe, and the auxiliary passage part of the thermal-type air flow measuring instrument is inserted from outside into the hole 85, and the housing member 51 is fixed on the sidewall of the auxiliary passage composition member mechanically with screws 87. The main passage composition member into which the auxiliary passage is inserted is a cylindrical tube, and its effective cross-sectional area with which the air flows in the main passage is almost identical at the entrance and exit of the auxiliary passage. A sealing material is inserted between the auxiliary passage composition member 56 and the main passage composition member in order to establish air resistance.

Next, a detailed aspect of the present invention is described below.

Figure 19:
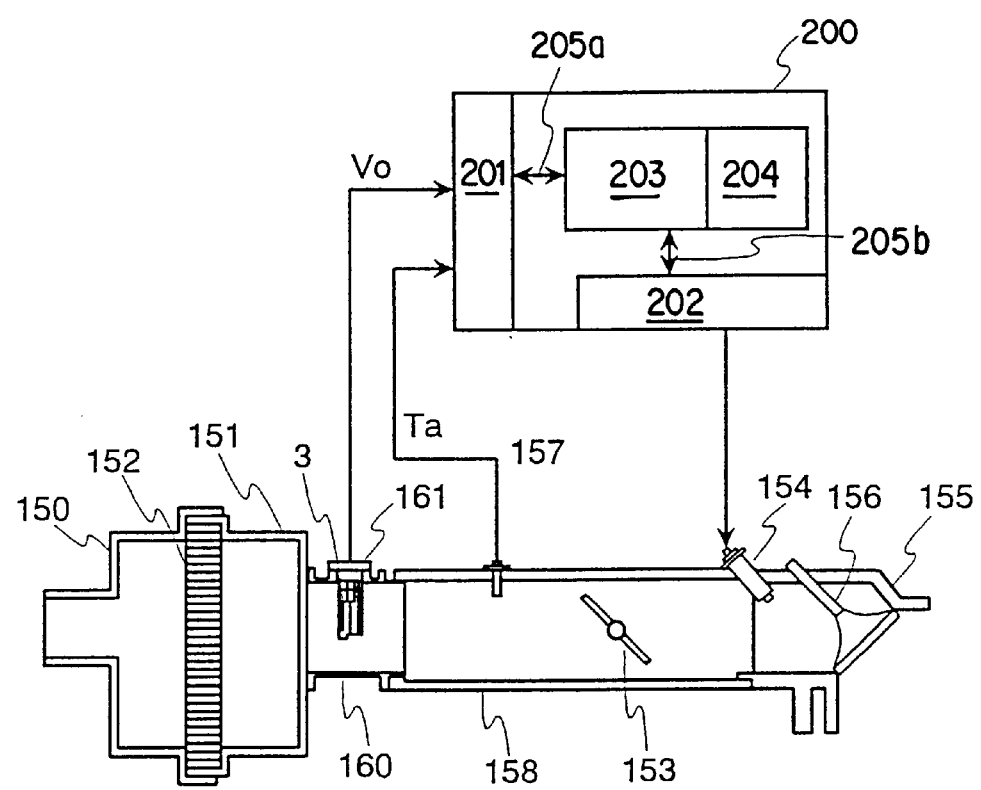
FIG. 19 is a schematic diagram of composition elements of the internal combustion engine required for understanding the present invention.

At first, FIG. 19 shows composition elements of the intake pipe in the internal combustion engine. Description is arranged from the upstream side of the air flow. The air cleaner is so defined with the air cleaner element 152 inserted between the air cleaner dirty-side case 150 and the air cleaner clean-side case 151. A part of the main passage is formed at the down stream side of the air cleaner with the body member 160 used as a composition material of the thermal-type air flow measuring instrument, and the overall intake pipe is formed by linking the intake manifold 155 and the body member 160 with the air intake duct 158 in which is an air flow valve 153.

Signals from various sensors in the combustion engine are processed and used for engine control by the engine control unit (hereinafter referred to as ECU) 200. Thus, error correction of measured temperature in the thermal-type air flow measuring instrument of the present invention is also performed in ECU 200.

ECU 200 has an input circuit part 201, an output circuit part 202, central processing unit (hereinafter referred to as CPU) 203 and memory 204 in its inside. The information exchange among the composition elements of ECU 200 is performed by the components marked with arrows 205a and 205b.

Figure 18:
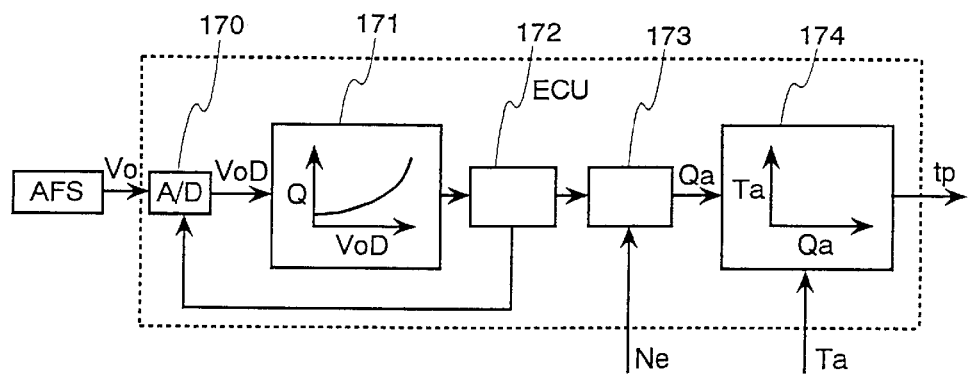
FIG. 18 is a block diagram showing measurement correction in the present invention.

The intake air temperature sensor 157 is mounted inside the intake air duct 158 for measuring the intake air temperature Ta, and the intake air flow in the intake air tube is measured by the heating resistor 11, both of which are sent to ECU 200. The measurement error due to temperature is corrected by CPU 203 referring to the correction value stored in the memory 204 and the air flow signal is estimated, and the control signal Tp corresponding to the obtained air flow signal for fuel injection operation is sent to the injector 154 upstream of the piston 156. The steps for calculating the intake air flow in the internal combustion engine are as shown in FIG. 18.

The intake air flow flowing in the intake pipe is measured by the heating resistor 11 and the measured value is supplied as the output voltage Vo from the drive circuit module 161. When the output voltage Vo is supplied to ECU 200, the output voltage V0 is converted to VoD by digital signal processing in A/D converter 170. The digital signal VoD is further converted to the air flow by the converter 171, and is integrated by the integrator 172 for the time T. Next, the engine revolution speed signal Ne is captured into ECU 200 and used for calculating the air flow Qa per a single cylinder in the computing unit 173. By combining the air flow Qa and the intake air temperature signal Ta from the intake air temperature sensor, correction of measurement error due to temperature change in the thermal-type air flow measuring instrument of the present invention is performed in the processing unit 174, and the corrected signal is put out as the injection signal tp for the injector 154 .

Figure 20:
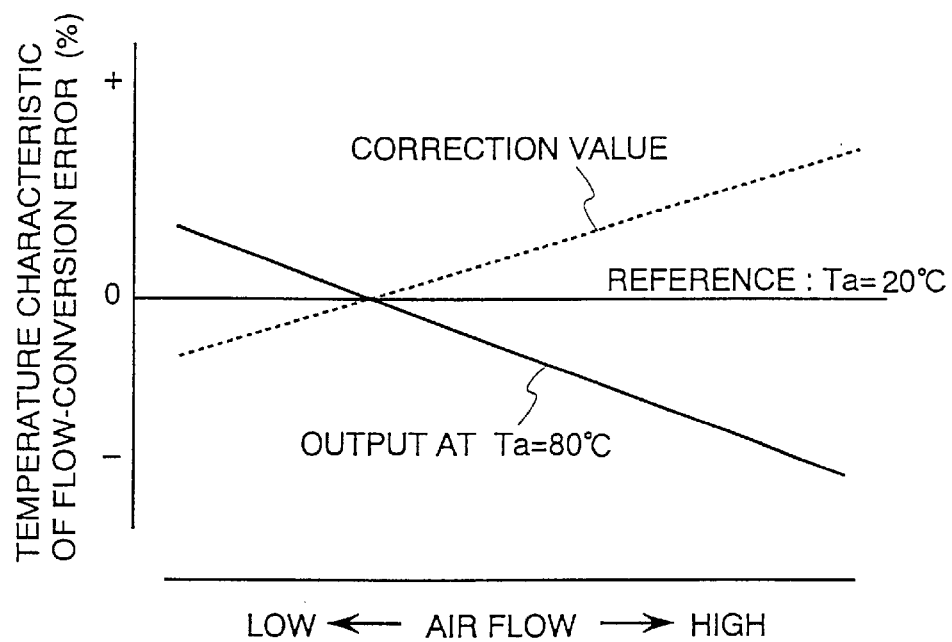
FIG. 20 is a graph representing the measurement error when the intake air temperature is high in the thermal-type air flow measuring instrument of the present invention.
Figure 21:
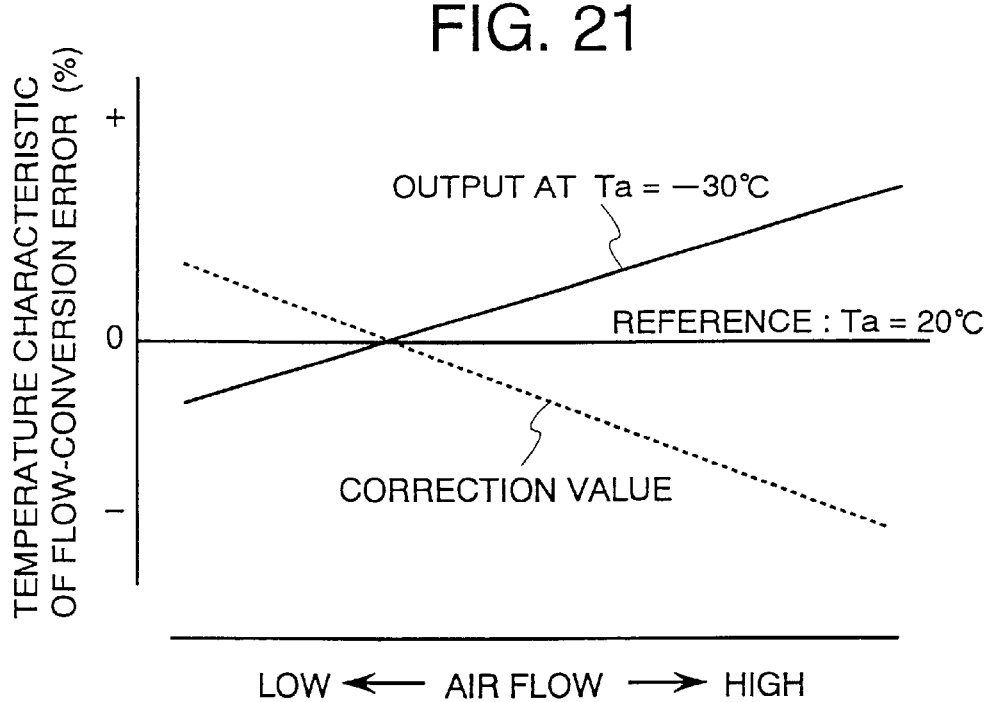
FIG. 21 is a graph representing the measurement error when the intake air temperature is low in the thermal-type air flow measuring instrument of the present invention.

As for the error correction calculation, for example, correction calculations shown in FIGS. 20 and 21 are performed. FIG. 20 shows a graphical representation of the measurement error when the temperature of the circuit module part of the thermal-type air flow measuring instrument is 20° C. and the intake air temperature is 80° C., with the reference value when both the temperature of the circuit module part of the thermal-type air flow measuring instrument and the intake air temperature are 20° C. The error at the lower flow is positive and the error at the higher flow is negative. The correction value is taken to be negative at the lower flow and to be positive at the higher flow in order to setoff the error.

FIG. 21 shows a graphical representation of the measurement error when both the temperature of the circuit module part of the thermal-type air flow measuring instrument and the intake air temperature is 20° C., with the reference value when only the intake air temperature is −30° C. The error at the lower flow is negative and the error at the higher flow is positive. The correction value is taken properly as shown in FIG. 20 in order to setoff the error.

Figure 22:
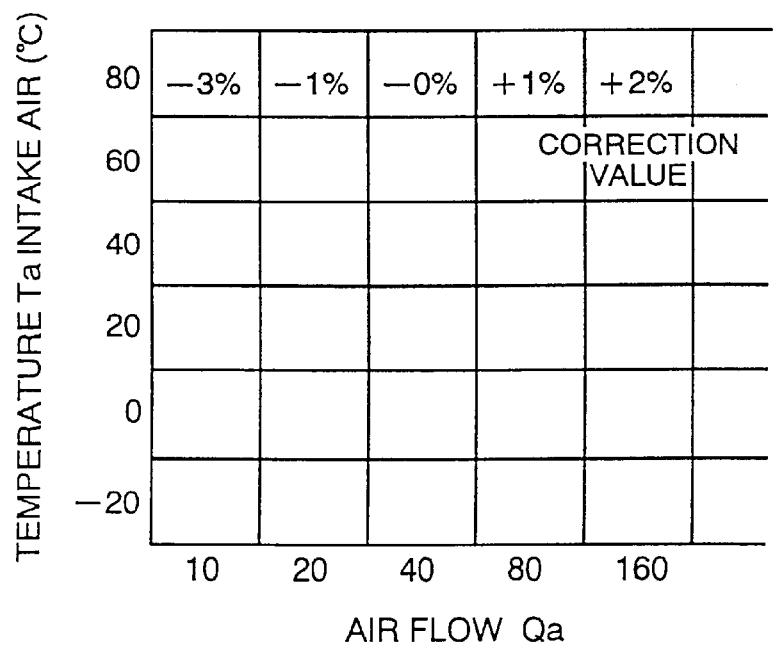
FIG. 22 is a correction map composed of temperature values and air flow values showing examples for the correction value in the present invention.

So far, as the measurement error in the thermal-type air flow measuring instrument changes for different flow and temperature, the correction calculation in the processing unit 174 shown in FIG. 18 is performed by reading the air flow and the intake air temperature and referring to the map containing correction values for intake air temperatures and intake air flows as shown in FIG. 22.

In the above description, though it is assumed that the correction procedures are executed by ECU. In recent years, thermal-type air flow measuring instruments including an intake air temperature sensor with its function extended are put into commercial production. For example, microcomputers are embedded inside the thermal-type air flow measuring instrument, and the system architecture in which intake air temperature and intake air flow are measured by microprocessors and the intake air flow signal and the intake air flow signal after correcting the measurement error due to temperature changes are sent to ECU also brings the same effect as the system described above does.

According to this embodiment of the present invention, thermal-type air flow measuring instruments enabling to correct measurement errors due to temperature changes for wider range of air flow levels can be provided.

In accordance with the foregoing disclosure, it is readily apparent that the present invention is capable of many variations. Detailed implementation can be derived from the description contained herein by a person skilled in the art. All such variations and modifications are considered to be within the scope and spirit of the present invention as defined by the following claims.

What is claimed is:

1. A temperature-error correcting apparatus for a thermal-type fluid flow measuring instrument, comprising:

a first resistance means for detecting a fluid flow rate of a fluid;

a second temperature-sensitive reference resistance means for providing a reference value, wherein the value of said second resistance means is a function of the temperature of said fluid and wherein said first and second resistance means are positioned within a passage of said fluid flow;

a control circuit for supplying a current to said first resistance means whereby said current flowing through said first resistance means is a signal indicating the fluid flow rate of the fluid;

temperature measuring means positioned within said fluid flow passage for providing a temperature output signal;

output adjusting circuit for adjusting a zero level of said fluid flow rate signal and for adjusting a gain of said flow rate signal as a function of a predetermined fluid flow rate characteristic, wherein said control circuit further includes a measurement error adjuster connected in series with said second resistance means whereby a value of said adjuster is set so that a measurement error of said fluid flow is constant regardless of the fluid flow rate.

2. The temperature-error correcting apparatus according to claim 1, wherein said temperature measuring means further include a means for adjusting a temperature signal output as a function of temperature characteristic of said first and said second resistance means.

3. The temperature-error correcting apparatus according to claim 1, wherein said measurement error adjuster is a resistor.

4. The temperature-error correcting apparatus according to claim 1, further comprising a first fixed resistor connected to said first resistance means in order to convert said current flowing through said first resistance means into a voltage.

5. The temperature-error correcting apparatus according to claim 4, further including a second fixed reference resistance connected to said second temperature-sensitive reference resistance means, whereby said first resistance means, said second temperature-sensitive reference resistance means, said fixed resistor and said second fixed resistor together form a bridge circuit.

6. The temperature-error correcting apparatus according to claim 1, wherein said error adjust provides that said measurement error of said fluid flow is constant regardless of the fluid flow rate for fluid temperatures between 80° C. and −40° C.

7. The temperature-error correcting apparatus according to claim 6, wherein a temperature of said first resistance means and said second temperature-sensitive reference resistance means is substantially different from a temperature of said fluid.

\* \* \* \* \*